(12) United States Patent
Heinrich et al.

(10) Patent No.: US 7,905,985 B2
(45) Date of Patent: Mar. 15, 2011

(54) PROCESS FOR PRODUCING HEATSEALABLE FILTER MATERIALS

(75) Inventors: Günter Heinrich, Gernsbach (DE);
Manfred Kaussen, Ottersweier (DE);
Martin Büchsel, Kehl (DE)

(73) Assignee: Glatfelter Gernsbach GmbH & Co. KG, Gernsbach (DE)

( * ) Notice: Subject to any disclaimer, the term of this patent is extended or adjusted under 35 U.S.C. 154(b) by 402 days.

(21) Appl. No.: 12/017,150

(22) Filed: Jan. 21, 2008

(65) Prior Publication Data
US 2008/0211122 A1    Sep. 4, 2008

Related U.S. Application Data

(62) Division of application No. 10/472,086, filed as application No. PCT/EP03/01672 on Feb. 19, 2003, now Pat. No. 7,344,034.

(30) Foreign Application Priority Data

Feb. 19, 2002    (DE) .................................. 102 06 924

(51) Int. Cl.
*D21F 11/00*    (2006.01)
(52) U.S. Cl. .................. 162/123; 162/129; 162/158
(58) Field of Classification Search .............. 162/123, 162/158, 129, 130, 157.5, 148, 149
See application file for complete search history.

(56) References Cited

U.S. PATENT DOCUMENTS

| | | | |
|---|---|---|---|
| 4,826,945 | A | 5/1989 | Cohn et al. |
| 5,021,510 | A | 6/1991 | Vroomans |
| 5,082,899 | A | 1/1992 | Sawyer et al. |
| 5,173,154 | A | 12/1992 | Heinrich |
| 5,227,229 | A | 7/1993 | McCoy et al. |
| 6,228,948 | B1 | 5/2001 | Flaris et al. |
| 6,506,873 | B1 | 1/2003 | Ryan et al. |
| 6,706,086 | B2 | 3/2004 | Emig et al. |
| 2003/0019598 | A1 | 1/2003 | Nakagawa et al. |
| 2003/0207639 | A1 | 11/2003 | Lin |
| 2004/0013831 | A1 | 1/2004 | Whittaker et al. |
| 2004/0018795 | A1 | 1/2004 | Viazmensky et al. |

FOREIGN PATENT DOCUMENTS

| | | |
|---|---|---|
| CA | 2289739 A1 | 11/1998 |
| DE | 2147321 | 3/1972 |
| DE | 3831709 | 3/1990 |
| DE | 3902298 C1 | 8/1990 |
| DE | 19719807 | 11/1998 |
| DE | 10206924 | 9/2003 |
| DE | 10206926 | 9/2003 |
| DE | 10231403 | 2/2004 |
| EP | 0380127 | 8/1990 |
| EP | 0641817 | 3/1995 |
| EP | 0656224 | 6/1995 |
| EP | 1266997 | 12/2002 |
| FR | 2663350 | 12/1991 |
| JP | 2001131826 | 5/2001 |
| WO | WO 9923306 | 5/1999 |

*Primary Examiner* — Mark Halpern
(74) *Attorney, Agent, or Firm* — RatnerPrestia (57) ABSTRACT

Processes for producing a filter material which contains heat-sealable, biodegradable and compostable polymeric fibers and is characterized in that it additionally contains a lubricant in an amount from 0.5 to 5.0% by weight, based on the paper weight of the ready-produced filter material.

16 Claims, 3 Drawing Sheets

FIG. 1

FIG. 3

PROCESS FOR PRODUCING HEATSEALABLE FILTER MATERIALS

CROSS-REFERENCE TO RELATED APPLICATION

This application is a divisional of U.S. patent application Ser. No. 10/472,086, filed Oct. 22, 2003.

FIELD OF INVENTION

The present invention related to a heatsealable filter material having excellent hot water stability and biodegradability, comprising fibers composed of a heatsealable, biodegradable and compostable material and a lubricant.

BACKGROUND OF THE INVENTION

It is known to pack tea or other goods into bags which are infused with hot water for use. These bags typically are made up of a first ply of a porous material composed of natural fibers and of a second ply composed of hot-melting polymeric fibers such as for example PP, PE or various interpolymers. This second ply serves to close the bag by heatsealing on high-speed packing machines.

This bag material can be produced in known manner by a wet-laid process on a paper machine, by a dry-laid process on a webbing machine or by a melt-blown process by laydown of polymeric fibers on a support layer.

The basis weight of the first ply of the material is generally in the range 8-40 g/m² and preferably in the range 10-20 g/m², the basis weight of the second polymeric fibrous ply is in the range 1-15 g/m² and preferably in the range 1.5-10 g/m².

It is known that used filter bags are disposed of on a compost heap or via the biowaste bin. After a certain period, which depends on further parameters such as temperature, moisture, microorganisms, etc, the natural fiber component of the filter bag will have disintegrated and become biodegraded, whereas the thermoplastic polymeric fibrous network remains intact and compromises the quality of the compost.

It is not practicable to separate the natural fiber component from the thermoplastic polymeric component; that is, the used filter bag ought to be put into the nonrecyclable waste (Gray Bin).

EP-A-0 380 127 describes a heatsealable paper for tea bags which has a basis weight of 10-15 g/m² and which for heatsealing has been provided with polymers such as PP, PE or an interpolymer and therefore is not biodegradable.

EP-A-0 656 224 describes a filter material especially for producing tea bags and coffee bags or filters having a basis weight between 8 and 40 g/m², wherein the heatsealable ply consists of polymeric fibers, preferably of polypropylene or polyethylene, which is laid down in the soft state onto the first ply, which consists of natural fibers.

JP-A-2001-131826 describes the production of biodegradable monofilaments from poly L lactide and the subsequent production therefrom of wholly synthetic woven tea bags by a dry-laid process.

The German patent application DE-A 21 47 321 describes a thermoplastic heatsealable composition which consists of a polyolefin powder (polyethylene or polypropylene) which is embedded in a carrier matrix of vinyl chloride-vinyl acetate copolymer. This material is likewise used for conferring heatsealability on fiber material produced by a papermaking process.

DE-A-197 19 807 describes a biodegradable heatsealable filter material of at least one ply of natural fibers and at least one second ply of heatsealable synthetic material which is biodegradable. This filter material is obtained by first applying an aqueous suspension of natural fibers to a paper machine wire and then depositing the heatsealable biodegradable polymeric fibers on the natural fiber layer in such a way that they are able to partly penetrate through the natural fiber layer.

A tea filter bag, for example, produced from this filter material has a high particle retention potential. However, this is bought at the expense of reduced air permeability. Yet, high air permeability coupled with good particle retention is the ultimate objective for any good filter material.

Prior art filter materials thus suffer from at least one of the following disadvantages:

1. The used filter materials such as for example tea bags, coffee bags or else other filters are frequently disposed of on a compost heap or in the biowaste bin. After a certain period, which depends on further parameters such as temperature, moisture, microorganisms, etc, the natural fiber component of the filter will have disintegrated and become biodegraded, whereas the thermoplastic polymeric fibrous network composed of polymeric fibers which do not biodegrade completely remains intact and compromises the quality of the compost.

And/or

2. The use of fully biodegradable polymeric materials known by prior art for tea bags and similar filter papers leads to the heatseal seams formed on a tea bag not withstanding a temperature of about 90-100° C.

This is because the production of heatsealed filled tea bags on high-speed packing machines occurs at a cycle time of about 1000 bags per minute.

So-called heatsealing rolls generally seal the bag at a temperature of 150-230° C. in a cycle time of less than 1 second. In the course of these short cycle times, the heatsealing material has to melt, adhere together and immediately resolidify and crystallize in order that, in further transportation, the bag is already resealed and no contents may escape.

As mentioned above, however, prior art materials do not meet the requirements of this operation.

SUMMARY OF THE INVENTION

It is an object of the present invention to provide a biodegradable and compostable filter material having excellent heatsealability and good seal seam strength in the dry and in the wet state.

It is another object of the present invention to describe a process for producing such filter materials.

It has now been found that, surprisingly, incorporating specific lubricants is a way to overcome the above-described disadvantages of prior art filter materials and to provide filter materials which are biodegradable and compostable and at the same time provide excellent properties with regard to heatsealability and seal seam strength.

The present invention accordingly provides a filter material which contains heatsealable, biodegradable and compostable polymeric fibers and is characterized in that it additionally contains a lubricant in an amount from 0.5 to 5.0% by weight, based on the paper weight of the ready-produced filter material.

The conjoint use of the heatsealable, biodegradable and compostable polymeric fibers and of the lubricant in the specified amount confers on the filter material according to the present invention the property that heatseal seams formed using the filter material according to the present invention (as described above) by means of a heatsealing roll is highly stable to hot water. As used herein, "stable to hot water" for the purposes of the present invention is understood to mean that a heatseal seam of a filter bag produced from the filter material according to the present invention will still be intact after a 4 min infusion.

In a preferred embodiment, the filter material according to the present invention may be heatsealed by ultrasound treatment.

By "biodegradable and compostable polymeric fibers", which are used according to the present invention, we understand fully biodegradable and compostable polymeric fibers as per German standard specification DIN 54900.

The lubricants which are useful according to the present invention are compounds which lead to improved lubricity for the polymeric fibers and thus augment and improve the congregation and orientation of crystalline zones. This increases the polymeric fibers' fraction of crystalline zones.

Such lubricants are well known to one skilled in the art. They are hydrocarbon oils or waxes or silicone oils. In a preferred embodiment, useful lubricants for the purposes of the present invention consist of fatty acid esters of long-chain fatty acids having a chain length from 10 to 40 carbon atoms, for example a fatty acid ester marketed by Henkel under the name Loxiol.

Preferably, the lubricant is present in the filter material of the present invention in an amount from 1.0 to 3.0% by weight.

Without wishing to be bound by any one theory, the inventors of the present invention currently believe that the employment of a lubricant benefits rapid recrystallization of the polymeric fibers, which is particularly necessary and helpful for heatseal strength, so that adjacent fibers in the weave very rapidly congregate to comparable crystallization zones which then develop to an increased extent.

In a preferred embodiment, the filter material of the present invention further contains a crystallization seed material which augments the crystallization of the fibers composed of the heatsealable, biodegradable and compostable material at heatsealing.

Useful crystallization seed materials for the purposes of the present invention include inorganic materials such as talc, kaolin or similar materials, customarily in a very finely divided form.

The particle size of the crystallization seed material is customarily in the range from 0.1 to 5 µm.

The amount of crystallization seed material added is customarily in the range from 0.01 to 1.0% by weight.

The starting materials for the fibers composed of the heatsealable, biodegradable and compostable material are according to the present invention fibers of polymers which are selected from the group of the aliphatic or partly aromatic polyesteramides and aliphatic or partly aromatic polyesters.

Specifically, they are the following polymers:
aliphatic or partly aromatic polyesters:
A) from aliphatic bifunctional alcohols, preferably linear $C_2$ to $C_{10}$ dialcohols such as for example ethanediol, butanediol, hexanediol or more preferably butanediol and/or optionally cycloaliphatic bifunctional alcohols, preferably having 5 or 6 carbon atoms in the cycloaliphatic ring, such as for example cyclohexanedimethanol, and/or, partly or wholly instead of the diols, monomeric or oligomeric polyols based on ethylene glycol, propylene glycol, tetrahydrofuran or copolymers thereof having molecular weights up to 4000, preferably up to 1000, and/or optionally small amounts of branched bifunctional alcohols, preferably $C_3$-$C_{12}$ alkyldiols, such as for example neopentylglycol, and additionally optionally small amounts of more highly functional alcohols such as for example 1,2,3-propanetriol or trimethylolpropane, and from aliphatic bifunctional acids, preferably $C_2$-$C_{12}$ alkyldicarboxylic acids, such as for example and preferably succinic acid, adipic acid and/or optionally aromatic bifunctional acids such as for example terephthalic acid, phthalic acid, naphthalenedicarboxylic acid and additionally optionally small amounts of more highly functional acids such as for example trimellitic acid, or
B) from acid- and alcohol-functionalized building blocks, preferably having 2 to 12 carbon atoms in the alkyl chain for example hydroxybutyric acid, hydroxyvaleric acid, lactic acid, or derivatives thereof, for example ε-caprolactone or dilactide,
or a mixture and/or a copolymer containing A and B, subject to the proviso that the aromatic acids do not account for more than a 50% by weight fraction, based on all acids;
aliphatic or partly aromatic polyesteramides:
C) from aliphatic bifunctional alcohols, preferably linear $C_2$ to $C_{10}$ dialcohols such as for example ethanediol, butanediol, hexanediol or more preferably butanediol and/or optionally cycloaliphatic bifunctional alcohols, preferably having 5 to 8 carbon atoms in the cycloaliphatic ring, such as for example cyclohexanedimethanol, and/or, partly or wholly instead of the diols, monomeric or oligomeric polyols based on ethylene glycol, propylene glycol, tetrahydrofuran or copolymers thereof having molecular weights up to 4000, preferably up to 1000, and/or optionally small amounts of branched bifunctional alcohols, preferably $C_2$-$C_{12}$ alkyldicarboxylic acids, such as for example neopentylglycol, and additionally optionally small amounts of more highly functional alcohols such as for example 1,2,3-propanetriol or trimethylolpropane, and from aliphatic bifunctional acids, such as for example and preferably succinic acid, adipic acid and/or optionally aromatic bifunctional acids such as for example terephthalic acid, isophthalic acid, naphthalenedicarboxylic acid and additionally optionally small amounts of more highly functional acids such as for example trimellitic acid, or
D) from acid- and alcohol-functionalized building blocks, preferably having 2 to 12 carbon atoms in the carbon chain for example hydroxybutyric acid, hydroxyvaleric acid, lactic acid, or derivatives thereof, for example ε-caprolactone or dilactide,
or a mixture and/or a copolymer containing C) and D), subject to the proviso that the aromatic acids do not account for more than a 50% by weight fraction, based on all acids,
E) with an amide fraction from aliphatic and/or cycloaliphatic bifunctional and/or optionally small amounts of branched bifunctional amines, preference is given to linear aliphatic $C_2$ to $C_{10}$ diamines, and additionally optionally small amounts of more highly functional amines, among amines: preferably hexamethylenediamine, isophoronediamine and more preferably hexamethylenediamine, and from linear and/or cycloaliphatic bifunctional acids, preferably having 2 to 12 carbon atoms in the alkyl chain or $C_5$ or $C_6$ ring in the case of cycloaliphatic acids, preferably adipic acid, and/or optionally small amounts of branched bifunctional and/or optionally aromatic bifunctional acids such as for example terephthalic acid, isophthalic acid, naphthalenedicarboxylic acid and additionally optionally small amounts of more highly functional acids, preferably having 2 to 10 carbon atoms, or
F) with from an amide fraction of acid- and amine-functionalized building blocks, preferably having 4 to 20 carbon atoms in the cycloaliphatic chain, preferably ω-laurolactam, ε-caprolactam, and more preferably ε-caprolactam,
or a mixture containing E) and F) as an amide fraction, subject to the proviso that the ester fraction C) and/or D) is at least 20% by weight, based on the sum total of C), D), E) and F), preferably the weight fraction of the ester structures is in the range from 20 to 80% by weight and the fraction of amide structures is in the range from 80 to 20% by weight.

All the monomers mentioned as acids can also be used in the form of derivatives such as for example acyl chlorides or esters, not only as monomers but also as oligomeric esters.

The synthesis of the biodegradable and compostable polyesteramides used according to the present invention can be effected not only according to the polyamide method, by stoichiometric mixing of the starting components optionally with addition of water and subsequent removal of water from the reaction mixture, but also according to the polyester method, by stoichiometric mixing of the starting components and also addition of an excess of diol with esterification of the acid groups and subsequent transesterification or transamidation of these esters. In this second case, not only water is distilled off again but also the excess of diol. The synthesis according to the polyester method described is preferred.

The polycondensation can further be speeded by the use of known catalysts. Not only the familiar phosphorus compounds, which speed up a polyamide synthesis, but also acidic or organometallic catalysts for the esterification as well as combinations of the two are possible for speeding the polycondensation.

Care must be taken to ensure that any catalysts used do not adversely affect either the biodegradability or compostability or the quality of the resulting compost.

Furthermore, the polycondensation to form polyesteramides can be influenced by the use of lysine, lysine derivatives or of other amidically branching products such as for example aminoethylaminoethanol, which not only speed the condensation but also lead to branched products (see for example EP-A-0 641 817; DE-A-38 31 709).

The production of polyesters is common knowledge or is carried out similarly to existing processes (cf. for example EP-A-0 592 975).

The polyesters or polyesteramides used according to the present invention may further contain 0.1 to 5% by weight, preferably 0.1 to 3% by weight and especially 0.1 to 1% by weight of additives, based on the polymer (cf. also description of the polymers). Examples of these additives are modifiers and/or filling and reinforcing materials and/or processing assistants such as for example nucleating assistants, customary plasticizers, demolding assistants, flame retardants, impact modifiers, colorants, stabilizers and other addition agents customary in the thermoplastics sector, although care must be taken to ensure with regard to the biodegradability requirement that complete compostability is not impaired by the additives and the additives which remain in the compost are harmless.

The biodegradable and compostable polyesters and polyesteramides have a molecular weight which is generally in the range from 5000 to 500000 g/mol, advantageously in the range from 5000 to 350000 g/mol and are preferably in the range from 10000 to 250000 g/mol, determined by gel chromatography (GPC) for example in m-cresol against a polystyrene standard. Preferably, the biodegradable and compostable polymers are random copolymers if they are copolymers.

In a preferred embodiment, the fibers composed of the heatsealable, biodegradable and compostable material are drawn, heatsealable, biodegradable and compostable polymeric fibers.

The drawn, heatsealable, biodegradable and compostable polymeric fibers used according to the present invention customarily have a linear density (DIN 1301, T1) in the range from 0.1 to 10 dtex and preferably in the range from 1.0 to 6 dtex.

These are present in the filter material according to the present invention in an amount which is customarily in the range from 0.05 to 50% by weight, based on the paper weight of the ready-produced filter material, advantageously in an amount from 0.1 to 45% by weight and preferably in an amount from 1.0 to 35% by weight.

The drawn, heatsealable, biodegradable and compostable polymeric fibers useful according to the present invention exhibit a draw ratio which is customarily in the range from 1.2 to 8 and preferably in the range from 2 to 6. The crystallization of the polymeric fibers which is induced by this drawing increases the boiling water resistance of these fibers after heatsealing.

The draw ratio referred to in connection with the present invention was determined in a manner which is generally known to one skilled in the relevant art.

The draw ratio required according to the present invention can be achieved in the course of the production of the polymeric fibers which are useful according to the present invention by performing the polymeric fiber production according to a melt-spinning process on commercially available spinning equipment so as to produce polymeric fibers having a draw ratio in the range from 1.2 to 8 and preferably in the range from 2 to 6. The following parameters have been determined to be beneficial process parameters for the production of preferred drawn polymeric fibers which are useful according to the present invention:

spinning temperature: 180 to 250° C., preferably 190 to 240° C.;
cooling air temperature: 10 to 60° C., preferably 20 to 50° C.;
hot drawing at 85 to 180° C., preferably 120 to 160° C.

The drawing of the polymeric fibers is customarily carried out in the presence of a hydrophilic substance in order that the water uptake may be improved owing to its wetting properties.

In a preferred embodiment, the polymeric fibers obtained on the spinning equipment after drawing are further heatset. This serves to minimize shrinkage of the drawn polymeric fibers. This heatsetting is customarily effected by a thermal treatment of the drawn polymeric fibers at temperatures from 10 to 40° C. below the respective melting point of the polymeric fibers.

The drawn polymeric fibers obtained are further customarily cut to a length in the range from 1 to 20 mm, advantageously in the range from 1 to 10 mm and preferably in the range from 2 to 6 mm as part of the filter material production operation before the drawn polymeric fibers are incorporated. This cutting of the polymeric fibers obtained is customarily effected using commercially available cutting tools for filaments.

In a preferred embodiment, the filter material according to the present invention may be heatsealed by ultrasound treatment.

In a preferred embodiment, the starting materials for the drawn polymeric fibers are polyesteramides having an ester fraction from 40% by weight to 65% by weight (inclusive) and an amide fraction from 35% by weight to 60% by weight (inclusive), for example a polyesteramide formed from 66 salt, adipic acid, butanediol having an amide content of 60% by weight and an ester content of 40% by weight and a weight average molecular weight of 19 300 (determined by GPC in m-cresol against polystyrene standard).

In a particularly preferred manner, the starting materials used for the drawn polymeric fibers are according to the present invention those having a moisture content of 0.1% by weight or less, based on the starting material polymer, preferably those having a moisture content of 0.01% by weight or less, in order that disruptions to the spinning and drawing of the polymeric fibers may be prevented.

The filter materials according to the present invention, as well as the fibers composed of a heatsealable, biodegradable and compostable material, contain natural fibers and/or cellulose derivative fibers in an amount from 50 to 99.95% by weight, based on the paper weight of the ready-produced filter material, advantageously in an amount from 65 to 99.9% by weight and preferably in an amount from 80 to 99.5% by weight.

Useful natural fibers for the purposes of the present invention include natural fibers known to one skilled in the art, such as hemp, manila, jute, sisal and others, and also long fiber wood pulp.

DETAILED DESCRIPTION OF THE INVENTION

An embodiment of the filter materials according to the present invention and their production will now be more particularly described.

In general, the filter materials according to the present invention, as well as the fibers composed of a heatsealable, biodegradable and compostable material and the lubricant, comprise at least one further component which comprises or preferably consists of natural fibers.

In this preferred embodiment of the present invention, the filter material according to the present invention is thus produced from two or more plies of different components, at least one ply containing natural fibers and one ply containing a blend of fibers of a heatsealable, biodegradable and compostable material and lubricant, such that the at least two plies are able to partly interpenetrate each other after production of the filter material. The degree of interpenetration of the plies can be controlled through the production process of the filter material, for example by controlling the degree of dewatering on the screen in the case of a paper machine being used.

In the case of the filter material according to the present invention being produced on a paper machine, the second ply typically comprises a blend of natural fibers, fibers of a heatsealable, biodegradable and compostable material and lubricant. This blend can be laid down on the first ply of natural fibers on the paper machine and so be fused with each other as well as with the paper ply.

In the case of the filter material according to the present invention being produced by a melt-blown process, the second ply typically comprises a fiber blend of heatsealable, biodegradable and compostable material and lubricant. This fiber blend may be melt-blown onto the first ply of natural fibers and so be fused with each other as well as with the paper ply.

The first ply of the filter material has a basis weight which is generally between 8 and 40 g/m$^2$ and preferably in the range from 10 to 20 g/m$^2$ and a DIN ISO 9237 air permeability in the range from 300 to 4000 l/m$^2$·s and preferably in the range from 500 to 3000 l/m$^2$·s.

The second ply of the filter material has a basis weight which is generally between 1 and 15 g/m$^2$ and preferably in the range from 1.5 to 10 g/m$^2$.

The first ply of the filter material (comprising or preferably consisting of natural fibers) is preferably constructed to have wet strength.

The first ply (comprising or preferably consisting of natural fibers) utilizes according to the invention typically known natural fibers, such as hemp, manila, jute, sisal and other long fiber wood pulps and also preferably mixtures thereof.

The second ply may contain or consist of a mixture of fibers composed of a heatsealable, biodegradable and compostable material and lubricant. The second ply, especially in the case of the filter material according to the present invention being produced on a paper machine, preferably, as well as the above constituents, comprises a further constituent, especially natural fibers, and mixing ratios of ⅓ natural fibers and ⅔ mixture of cellulose derivative and polymeric fibers are particularly preferred.

The filter material according to the present invention may be used for example for producing tea bags, coffee bags or tea or coffee filters.

As observed above, the process for producing the filter materials according to the present invention can be controlled in such a way that the heatsealable, biodegradable and compostable fibers of the second ply partially interpenetrate the first ply and thus encase the fibers of the first ply, preferably the natural fibers of the first ply, in the molten state in the course of the drying operation on the paper machine for example. However, according to the present invention, the necessary pores for filtration are left unblocked.

Figure 1:
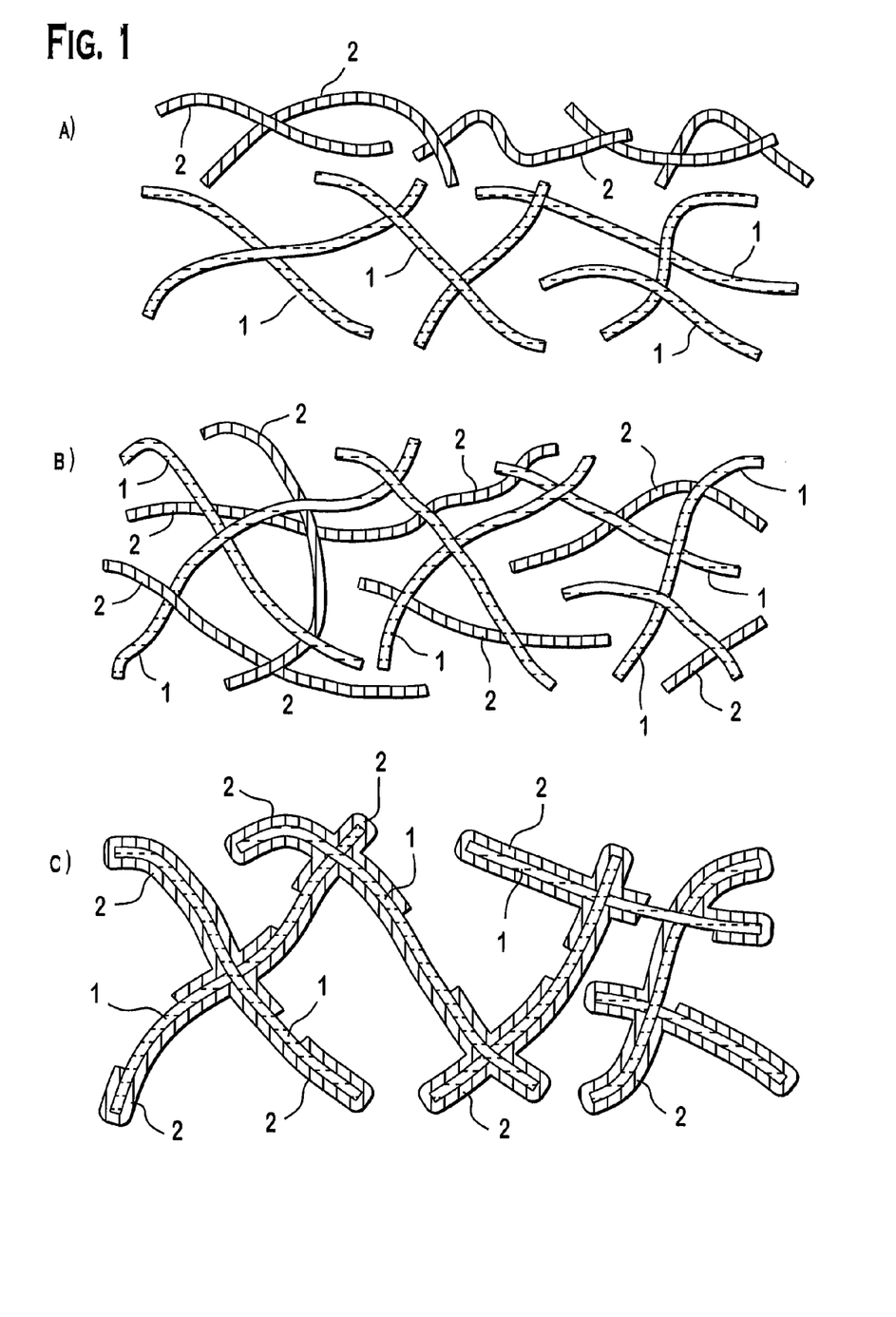
FIGS. 1A-1C are schematic diagrams of the filter material illustrating the fibers and the partial interpenetration of the fibers.

A production process which may be used according to the present invention will now be more particularly described by way of example for a two-ply filter material with reference to the drawings, where FIG. 1 illustrates the various stages in the formation of the inventive filter material from natural fibers and synthetic fibers for the example of the use of a paper machine in a general, broadly schematic diagram.

FIG. 1 illustrates the formation of the filter material according to the present invention in a schematic diagram. FIG. 1a) depicts the formation of a first fibrous layer consisting of natural fibers 1 and the formation of a second fibrous layer comprising synthetic, biodegradable and compostable heatsealable fibers 2. The formation of the second layer comprising the fibers 2 thus takes place by laydown atop the first layer, which is formed by the natural fibers 1. To distinguish them in the drawing, the natural fibers 1 are shown with horizontal hatching and the heatsealable fibers 2 with approximately vertical hatching.

FIG. 1b) shows how the described dewatering of the two layers, especially of the second layer comprising the fibers 2, achieves a partial interpenetration of the two layers, so that the synthetic fibers 2 end up between the natural fibers 1.

In a further production step, the mutually partially interpenetrating layers 1 and 2 are dried and in the course of drying heated such that the synthetic fibers 2 melt and, on resolidifying, come to surround the fibers 1 such that these are at least partially encased. The filter material has thus been rendered heatsealable (FIG. 1c).

Figure 2:
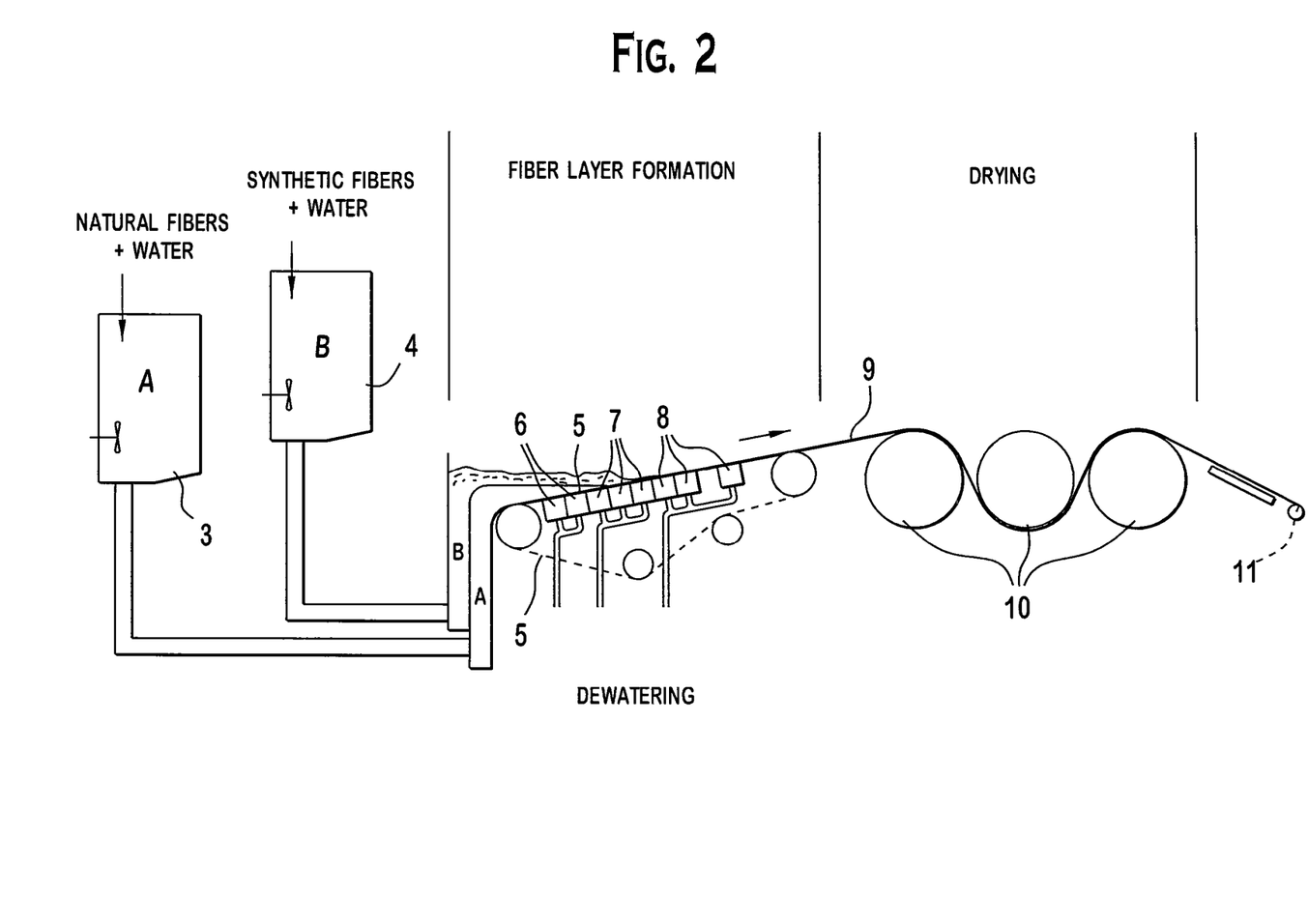
FIG. 2 is a schematic representation of the equipment used in the wet-laid process.

FIG. 2 shows the fundamental construction of a paper machine as can be used for producing a filter material according to the present invention. First, a suspension "A" is formed from the beaten natural fibers and water. In addition, a suspension "B" is prepared with the blend of fibers of a heatsealable, biodegradable and compostable material and lubricant and optionally a fraction of other fibers, for example natural fibers, and also water.

These two suspensions A and B are fed from the respective vessels (3 and 4) via the head box to the paper machine. It possesses essentially a circulating screen (5) which travels across a number of dewatering chambers (6, 7 and 8).

Suitable piping and pumping means (not depicted) are used to pass the suspension A onto the screen 5 above the first two dewatering chambers 6, the water being sucked away through the chambers 6 and the dewatering line. In the process, a first layer of the natural fibers 1 is formed on the moving screen 5. As the screen 5 continues to travel across the dewatering chambers 7 the second suspension B is supplied, and the second layer of synthetic fibers is laid down on top of the first layer above the dewatering chambers 7. In the process, dewatering takes place through the dewatering line. In the course of the further movement of the screen 5 bearing the two superposed fibrous layers, a dewatering operation is conducted above the dewatering chambers 8, as a result of which the two layers come to partially interpenetrate each other. The degree of interpenetration can be varied through appropriate adjustment of the degree of dewatering.

The resultant formed material 9, composed of natural fibers and polymeric fibers, is then taken off the screen and sent to a drying operation. This drying operation can be effected in various ways, for example by contact drying or flowthrough drying.

The elements 10 are merely a rough diagrammatic suggestion of appropriate drying elements.

FIG. 2 by reference numeral 10 identifies 3 drying cylinders, via which the formed paper web is contact dried. However, it is also practicable to lead the resultant paper web over one cylinder only and to dry it with hot air without the web resting on this cylinder.

The heating of the two-ply fibrous material causes the synthetic fibers 2 in the mixed layer 9 to melt. As they resolidify at the exit from the drying station, the synthetic fibers come to at least partially encase the natural fibers and the heatsealable filter material is wound up on a roll 11.

The biodegradable and compostable filter material according to the present invention may further be produced by a melt-blown process as will now be described for a two-ply filter material:

When the mixture of biodegradable and compostable polymer and lubricant that forms the second ply is in the form of granulate, it may be melt-blown into fibers which are laid down, while still hot and tacky, on a substrate, for example a paper composed of natural fibers.

Figure 3:
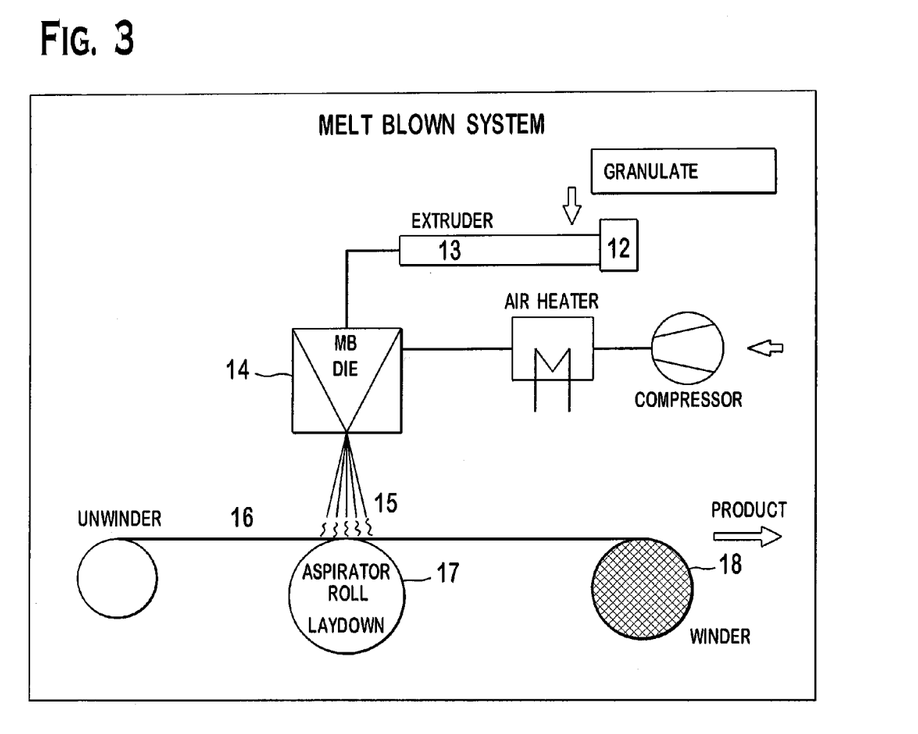
FIG. 3 is a schematic representation of the equipment used in the melt-blown process.

This operation forms part of the prior art (see for example EP-A-0 656 224, DE-A-197 19 807), but the fundamentals of the process depicted in FIG. 3 will now be briefly discussed nonetheless:

The dried granulate 12 is transported into an extruder 13, where it is melted and heated to the temperature needed for fiber formation. This molten and heated mixture then arrives at the MB die 14. This die has a large number of small openings through which the molten polymer mixture is pressed and pulled to form fibers. These fibers 15 emerge directly under this die into a high-velocity air stream which further attenuates them and breaks them up into different lengths and are laid down on a collecting surface, for example on a paper of natural fibers 16 which rests on an aspirator roll 17. Since these fibers are still in the hot, tacky state, they adhere to the natural fibers of the paper. The material is then wound up in the cooled state on the winder 18. The typical diameters of these melt-blown fibers are between 2 and 7 µm. FIG. 3 is a schematic representation of the melt-blown process.

EXAMPLES

Example 1

First, a single-ply filter material having a basis weight of about 13 g/m² was produced on a paper machine by the wet-laid process from natural fibers (mixture of 35% by weight of manila fibers and 65% by weight of softwood pulp). The filter material was given a treatment to enhance its wet strength.

The above-described filter material was then coated with about 3.5 g/m² of biodegradable polymeric fibers and a lubricant (Loxiol from Henkel) on a conventional state-of-the-art melt-blown system at a linear speed of about 130 m/min (99.5% of biodegradable polyesteramide, 0.5% of Loxiol). The temperatures at the individual zones of the spinneret dies were 224-227° C. in this run.

Tea bags were then fabricated by hand from this 2-ply filter material and filled with 1.9 g of tea. These ready-fabricated tea bags were then sealed on all four sides using an HSE-3 commercial sealing apparatus from RDM.

| Parameter: | temperature: | 210° C. |
|---|---|---|
| | time: | 0.5 sec |
| | pressure: | 3 bar |

Infusion test: three arbitrarily selected tea bags fabricated in accordance with the above description had boiling water poured over them and were allowed to infuse for 4 min.

None of the bags came undone.

Example 2

The run described above was continued under the same conditions except for a changed polyesteramide-Loxiol content.
a. 99% of biodegradable polyesteramide, 1% of Loxiol
b. 98% of biodegradable polyesteramide, 2% of Loxiol
Result of Infusion Test:
None of the bags came undone.

For comparison, a filter material was produced as per the above directions, except that the biodegradable heatsealable polymeric fibers were replaced by a nonbiodegradable vinyl chloride-vinyl acetate copolymer.

None of the three bags fabricated therefrom came undone in the infusion test described above.

Although the invention is illustrated and described herein with reference to specific embodiments, the invention is not intended to be limited to the details shown. Rather, various modifications may be made in the details within the scope and range of equivalents of the claims and without departing from the invention.

What is claimed:
1. A process for producing a filter material comprising producing a filter material by a wet-laid process wherein the filter material comprises a plurality of first fibers and a plurality of second fibers, wherein the plurality of second fibers comprises a heatsealable, biodegradable and compostable material and wherein the heatsealable, biodegradable and compostable material is combined with a lubricant in an amount from 0.5 to 5.0% by weight, based on paper weight of a ready-produced filter material.

2. A process for producing a filter material according to claim 1, wherein the plurality of second fibers consists essentially of the heatsealable, biodegradable and compostable material.

3. A process for producing a filter material by a wet-laid process comprising:
   (a) forming a first suspension of a plurality of first fibers in water, wherein the plurality of first fibers comprises natural fibers;
   (b) forming a second suspension of a plurality of second fibers in water with a lubricant in an amount to achieve a concentration of lubricant of from 0.5 to 5.0% by weight based on paper weight of a produced filter material, wherein the plurality of second fibers comprises a heatsealable, biodegradable and compostable material;
   (c) forming a first fibrous layer by depositing the first suspension onto a circulating screen traveling across at least one dewatering chamber; and
   (d) forming a second fibrous layer by depositing the second suspension on top of the first fibrous layer traveling along the circulating screen and across the at least one dewatering chamber.

4. A process for producing a filter material according to claim 3, wherein the first fibrous layer begins dewatering before the second suspension is deposited on top of the first fibrous layer.

5. A process for producing a filter material according to claim 3, further comprising:
   (e) dewatering the first and second fibrous layers causing at least a partial interpenetration of the first and second fibrous layers.

6. A process for producing a filter material according to claim 5, wherein the dewatering step comprises adjusting the degree of dewatering to control the degree of interpenetration.

7. A process for producing a filter material according to claim 5, further comprising:
   (f) drying the first and second fibrous layers to form a filter material.

8. A process for producing a filter material according to claim 7, wherein the drying step is performed by contact drying.

9. A process for producing a filter material according to claim 7, wherein the drying step is performed by flowthrough drying.

10. A process for producing a filter material according to claim 7, wherein the drying step causes the plurality of second fibers to melt; and subsequent to the drying step the melted fibers resolidify resulting in the second fibers at least partially encasing the first fibers.

11. A process for producing a filter material according to claim 7, further comprising:
    (g) forming the dryed filter material into tea bags, coffee bags, tea filters, or coffee filters.

12. A process for producing a filter material according to claim 5, further comprising:
    (f) heating the first and second fibrous layers, wherein the heating causes the plurality of second fibers to melt; and subsequent to heating the melted fibers resolidify resulting in the second fibers at least partially encasing the first fibers.

13. A process for producing a filter material according to claim 3, wherein the natural fibers are selected from the group consisting of hemp, manila, jute, sisal, and combinations thereof.

14. A process for producing a filter material according to claim 3, wherein the natural fibers are a blend of manila and softwood pulp.

15. A process for producing a filter material according to claim 14, wherein the filter material is arranged as a tea filter, a coffee filter, a tea bag, or a coffee bag.

16. A process for producing a filter material according to claim 3, wherein the plurality of second fibers consists essentially of the heatsealable, biodegradable and compostable material.

* * * * *

UNITED STATES PATENT AND TRADEMARK OFFICE
CERTIFICATE OF CORRECTION

PATENT NO. : 7,905,985 B2
APPLICATION NO. : 12/017150
DATED : March 15, 2011
INVENTOR(S) : Günter Heinrich, Manfred Kaussen and Martin Büchsel Page 1 of 1

It is certified that error appears in the above-identified patent and that said Letters Patent is hereby corrected as shown below:

On the Title page, item (30), Foreign Application Priority Data delete
"(DE) ........................102 06 924" and insert --(DE) ............................102 06 924.7--.

Signed and Sealed this
Thirteenth Day of November, 2012

David J. Kappos
*Director of the United States Patent and Trademark Office*